United States Patent
Araki et al.

(10) Patent No.: US 6,706,819 B1
(45) Date of Patent: Mar. 16, 2004

(54) FLEXIBLE FLUORINE-CONTAINING MATERIAL HAVING HEAT RESISTANCE AND NON-TACKINESS

(75) Inventors: Takayuki Araki, Settsu (JP); Nobuhiro Hirano, Settsu (JP); Noritoshi Oka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 92 days.

(21) Appl. No.: 10/018,345

(22) PCT Filed: Jun. 22, 2000

(86) PCT No.: PCT/JP00/04078

§ 371 (c)(1),
(2), (4) Date: Dec. 19, 2001

(87) PCT Pub. No.: WO01/00697

PCT Pub. Date: Jan. 4, 2001

(30) Foreign Application Priority Data

Jun. 30, 1999 (JP) .......................................... 11/186792

(51) Int. Cl.$^7$ ............................................... C08L 27/12
(52) U.S. Cl. ..................... 525/199; 525/276; 525/326.2
(58) Field of Search ................................. 525/199, 276, 525/326.2

(56) References Cited

U.S. PATENT DOCUMENTS

| | | | |
|---|---|---|---|
| 4,158,678 A | | 6/1979 | Tatemoto et al. |
| 4,487,882 A | | 12/1984 | Ueta et al. |
| 4,560,737 A | | 12/1985 | Yamamoto et al. |
| 4,935,467 A | | 6/1990 | Cheng et al. |
| 5,891,538 A | * | 4/1999 | Yamamoto et al. ......... 428/36.9 |

FOREIGN PATENT DOCUMENTS

| | | |
|---|---|---|
| EP | 0 524 700 A1 | 1/1993 |
| EP | 683186 | 11/1995 |
| EP | 0 924 257 A1 | 6/1999 |
| JP | 06025500 | 2/1994 |
| JP | 09066570 | 3/1997 |
| WO | WO 87/06597 A1 | 11/1987 |
| WO | WO 98/54259 A1 | 12/1998 |
| WO | WO 00/04091 A1 | 1/2000 |

OTHER PUBLICATIONS

International Preliminary Examination Report for PCT JP00 04078 dated Sep. 6, 2001.
International Search Report for PCT JP00 04078 dated Sep. 26, 2000.
Supplementary European Search Report for EP 00 93 9118 dated Aug. 6, 2002.

* cited by examiner

Primary Examiner—James J. Seidleck
Assistant Examiner—Thao Tran
(74) Attorney, Agent, or Firm—Sughrue Mion, PLLC

(57) ABSTRACT

To provide the fluorine-containing material which is capable of giving various products, particularly products and parts for OA equipment, is excellent in flexibility, mechanical strength, viscoelasticity and mold-processability and possesses improved non-tackiness. The flexible fluorine-containing material comprises (a) the fluorine-containing multi-segment polymer having the elastomeric fluorine-containing polymer chain segment A and the non-elastomeric fluorine-containing polymer chain segment B in which the elastomeric fluorine-containing polymer chain segment A comprises not less than 90% by mole of a perhaloolefin unit and (b) the fluorine-containing resin having a crystalline melting point or glass transition temperature of not less than 150° C., in which a weight ratio (a)/(b) is 1/99 to 99/1.

14 Claims, No Drawings

FLEXIBLE FLUORINE-CONTAINING MATERIAL HAVING HEAT RESISTANCE AND NON-TACKINESS

TECHNICAL FIELD

The present invention relates to a fluorine-containing material having heat resistance and non-tackiness while having flexibility.

BACKGROUND ART

Fluorine-containing materials such as fluorine-containing resins and fluorine-containing rubbers are used as various starting materials in various fields by utilizing specific properties thereof Particularly the fluorine-containing materials play an important role in the field of OA equipment.

In that field, hitherto a urethane rubber, EP rubber, silicone rubber and the like have been used for rolls for printing machine and platen rolls. Also a silicone rubber roll, a fluorine-containing rubber roll and the like are known as a fuser roll for electro photographic copying machine. However in those rolls, even in case of use of a toner having releasing property, since releasing property (non-tackiness against toner) is not enough, a non-elastic roll coated with a fluorine-containing resin, an elastic roll covered with a shrinkable fluorine-containing resin tube on its surface, or the like has been proposed. Further there have been proposed an elastic roll obtained by coating a mixture of fluorine-containing rubber and fluorine-containing resin powder and then baking to form a fluorine-containing resin powder layer on the surface of roll (JP-B-1-36622), a roll obtained by coating a fluorine-containing rubber and fluorine-containing resin powder, baking and then further coating a fluorine-containing resin powder to form a fluorine-containing resin layer PJP-B-6-100876), and the like roll.

In fixing operation of electrophotographic copying machine, coating of a releasing oil, generally a silicone oil on a fuser roll is carried out to improve releasing property of the fuser roll. In that case, in order to prevent a silicone oil from permeating inside the fuser roll and causing swelling of the roll, there have been proposed a fuser roll obtained by covering a shrinkable fluorine-containing resin tube on an elastic roll or a fuser roll provided with a silicone rubber layer, a fluorine-containing rubber layer or a fluorosilicone rubber layer and a silicone rubber layer in that order on its metallic core roll as described in JP-A- 1-205188, etc.

Also in JP-A-62-285839, the inventors of the present invention proposed an elastic roll obtained by forming, on its metallic core roll, a layer of a heat resistant elastomer material impregnated and integrated with fibrillated polytetrafluoroethylene (PTFE), particularly stretched porous polytetrafluoroethylene.

On the other hand, in the roll for printing machine and platen roll which are produced by using a urethane rubber, EP rubber or silicone rubber, elasticity of the roll is good, but releasing property cannot always be said to be good. For that reason, there were problems that troubles such as adherence of toner, contamination of printed matters due to adherence of paper powder and winding of paper on a roll occurred.

Particularly in case of the fuser roll for electrophotographic copying machine, a non-elastic roll coated with a fluorine-containing resin such as PFE or PFA (copolymer of tetrafluoroethylene and perfluoro(alkyl vinyl ether)) has a defect that the roll has no elasticity, and a roll obtained by covering a surface of elastic roll with a shrinkable fluorine-containing resin tube is not always satisfactory from the viewpoint of surface elasticity since the fluorine-containing resin is hard and small in elongation. Further an elastic roll having a fluorine-containing resin powder layer on its surface (formed by powder coating of PFA, etc.) is good in elasticity and releasing property at an initial stage of its use, but since the fluorine-containing resin powder on its surface is easily peeled or separated, a life of the releasing property is short and further in application for a fuser roll in which its temperature becomes as high as 150° to 200° C., heat resistance of the roll is not enough. Particularly since the fluorine-containing rubber component is deteriorated and strength thereof is decreased, durability of the roll is lowered.

Also as described in JP-A-1-205188, etc., with respect to the roll having a silicone rubber layer on a fluorine-containing rubber layer or fluorosilicone rubber layer, strength of the silicone rubber layer on the roll surface is insufficient. If an amount of a filler is increased to increase the strength, releasing property is lowered. Further since an adhesive strength between the silicone rubber layer and the fluorine-containing rubber layer or fluorosilicone rubber layer is not enough, there is a problem that coating of a silicone oil and fixing operations are carried out repeatedly, thereby causing cracking on the surface silicone rubber layer and peeling thereof in the worst case. Further in application for a fuser roll in which its temperature becomes as high as 150° to 200° C., the surface silicone rubber layer and the inside fluorine-containing rubber layer or fluorosilicone rubber layer are deteriorated and abraded due to lowering of strength since heat resistance thereof is insufficient.

Also the elastic roll disclosed in JP-A-62-285839 is very excellent in releasing property and good in affinity and anti-swelling property with a silicone oil, but is poor in elastic properties, particularly elasticity recovering ability. Further the elastic roll is poor in heat conductivity and has a problem that its surface temperature is lowered particularly at the time of copying continuously.

In recent years, in a copying machine, the tendency is toward color printing and higher copying speed, and thus a surface material for rolls of fixing part which has more flexibility, heat resistance and non-tackiness is demanded.

In LBP having a tendency toward color printing, high quality image and high speed, a toner itself also has a tendency of multi-colors and low viscosity. From the viewpoint of prevention of offsetting, more non-tackiness is also demanded on a material to be used on a surface of the fuser roll.

An object of the present invention is to provide a flexible fluorine-containing material which can cope with the above-mentioned problems in the field of OA equipment and naturally can be applied on various products, parts and coating in other fields.

The present inventors have found that a specific fluorine-containing multi-segment polymer having an elastomeric fluorine-containing polymer chain segment capable of giving flexibility to the whole polymer and a non-elastomeric fluorine-containing polymer chain segment is suitable for applications where heat resistance, flexibility and non-tackiness are demanded, and also have found that the above-mentioned problematic points can be further improved by a combination of the specific fluorine-containing multi-segment polymer and a specific fluorine-containing resin.

The flexible fluorine-containing material can be preferably used particularly as a material for rolls of OA equipment to be used for electronically fixing and photo-sensing applications. Particularly by using on a fuser roll, excellent fixing property, color developing property, oil resistance, non-tackiness against toner and releasability of a paper can be exhibited and further heat resistance, non-tackiness, durability and abrasion resistance can be given to the surface of the roll.

DISCLOSURE OF INVENTION

The present invention relates to a flexible fluorine-containing material which comprises (a) a fluorine-containing multi-segment polymer having an elastomeric fluorine-containing polymer chain segment A and a non-elastomeric fluorine-containing polymer chain segment B in which the elastomeric fluorine-containing polymer chain segment A comprises not less than 90% by mole of perhaloolefin units and (b) a fluorine-containing resin having a crystalline melting point or glass transition temperature of not less than 150° C., in which a weight ratio (a)/(b) is 1/99 to 99/1.

It is preferable that the elastomeric fluorine-containing polymer chain segment A contained in the fluorine-containing multi-segment polymer (a) is non-crystalline and has a glass transition temperature of not more than 25° C. and that the elastomeric fluorine-containing polymer chain segment A is a polymer chain comprising 50 to 85% by mole of tetrafluoroethylene and 15 to 50% by mole of perfluoro (alkyl vinyl ether) and/or hexafluoropropylene.

It is preferable that the non-elastomeric fluorine-containing polymer chain segment B contained in the fluorine-containing multi-segment polymer (a) is a polymer chain having a crystalline melting point or glass transition temperature of not less than 150° C., particularly not less than 250° C. and that the non-elastomeric fluorine-containing polymer chain segment B is, a polymer chain comprising more than 85% by mole and not more than 100% by mole of tetrafluoroethylene and 0% by mole or less than 15% by mole of a compound of the formula (1):

$$CF_2=CF-R_f^1 \quad (1)$$

wherein $R_f^1$ is $CF_3$ or $OR_f^2$, in which $R_f^2$ is a perfluoroalkyl group having 1 to 5 carbon atoms.

Particularly it is preferable that a proportion of the non-elastomeric fluorine-containing polymer chain segment B contained in the fluorine-containing multi-segment polymer (a) is not more than 25% by weight based on the whole segment polymer (a).

On the other hand, it is preferable that the above-mentioned fluorine-containing resin (b) is a fluorine-containing resin having a crystalline melting point or glass transition temperature of not less than 250° C. and further that the fluorine-containing resin (b) is one or more members selected from perfluoro fluorine-containing resins, particularly polytetrafluoroethylene (PTFE), tetrafluoroethylene/ perfluoro(alkyl vinyl ether) copolymer (PFA), tetrafluoroethylene/hexafluoropropylene copolymer (FEP) and tetrafluoroethylene/hexafluoropropylene/perfluoro (alkyl vinyl ether) copolymer (EPA).

The preferable weight ratio (a)/(b) is 40/60 to 99/1.

BEST MODE FOR CARRYING OUT THE INVENTION

First the fluorine-containing multi-segment polymer which is the component (a) of the present invention is explained below.

It is important that the fluorine-containing multi-segment polymer contains, in one molecule thereof, the elastomeric fluorine-containing polymer chain segment A (hereinafter referred to as "elastomeric segment A") and the non-elastomeric fluorine-containing polymer chain segment B (hereinafter referred to as "non-elastomeric segment B") which are bonded in a blocked or grafted form.

In the present invention, for bonding the elastomeric segment A to the non-elastomeric segment B by blocking or grafting to obtain the fluorine-containing multi-segment polymer, various known processes can -be adopted. Among them, a process for preparing a blocked fluorine-containing multi-segment polymer which is disclosed in JP-B-58-4728, etc., a process for preparing a grafted fluorine-containing multi-segment polymer which is disclosed in JP-A-62-34324, and the like process can be adopted preferably.

Particularly preferred is the blocked fluorine-containing multi-segment polymer synthesized through a so-called iodine transferring polymerization method which is disclosed in JP-B-58-4728 and Kobunshi Ronbunshu (Vol. 49, No. 10, 1992) from the viewpoint that a segmenting ratio (blocking ratio) is high and a uniform and regular segment polymer can be obtained.

On the other hand, in case of a simple mixture of an elastomeric fluorine-containing polymer and non-elastomeric fluorine-containing polymer, generally mechanical properties (particularly at high temperature) become insufficient and lowering of abrasion resistance, flexibility and durability arises though it depends on kind, miscibility and compatibility of the respective polymers to be mixed.

On the contrary, when the fluorine-containing resin is mixed to the multi-segment polymer prepared by bonding the elastomeric segment A and the non-elastomeric segment B by blocking or grafting like the present invention, heat resistance, mechanical properties (particularly at high temperature), etc. are enhanced more and also in case of use for rolls, heat resistance, durability and abrasion resistance can be improved more effectively as compared with the above-mentioned simple mixture of an elastomeric fluorine-containing polymer and non-elastomeric fluorine-containing polymer.

Further a rubber roll provided with a layer of fluorine-containing thermoplastic rubber having an elastomeric fluorine-containing polymer chain segment containing vinylidene fluoride as a main component on its outer surface has been proposed (Utility Model Publication JU-B-2-15873). However though the fluorine-containing segment polymer is used, heat resistance and non-tackiness are not enough because the elastomeric fluorine-containing polymer chain segment does not contain a perhaloolefin unit as a main component.

The present inventors have further found that in the iodine transferring polymerization method, when not less than 90% by mole of perhaloolefin units are contained as a recurring unit in the elastomeric segment A, a block copolymerization reaction with a monomer for the non-elastomeric segment B proceeds regularly and uniformly and it is possible to largely decrease an amount of unintended products such as a molecule comprising only the elastomeric fluorine-containing polymer chain segment which is not bonded to the non-elastomeric component and the non-elastomeric fluorine-containing polymer chain segment having a low molecular weight even if a bonding occurs. The inventors also have found that the flexible fluorine-containing material of the present invention produced by mixing the thus obtained fluorine-containing multi-segment polymer (a) to the fluorine-containing resin (b) is excellent in mechanical properties, heat resistance, mechanical properties at high temperature and abrasion resistance and molded article produced therefrom is useful as a material for various products, for example, a heat resistant material for OA equipment, particularly rolls and belts for OA equipment. On the other hand a material comprising an unintended fluorine-containing multi-segment polymer having an un-reacted elastomeric fluorine-containing polymer chain segment has an adverse effect on products and parts produced therefrom such as lowering of mechanical strength, heat resistance and abrasion resistance.

Further the present inventors have found that by mixing the fluorine-containing multi-segment polymer (a) to the fluorine-containing resin (b), non-tackiness, particularly easiness of removing a stain is excellent as compared with a mere blend of an elastomeric fluorine-containing polymer and a fluorine-containing resin and a material comprising only a fluorine-containing multi-segment polymer.

The flexible fluorine-containing material of the present invention can be given a good flexibility by the elastomeric segment A contained in the fluorine-containing multi-segment polymer (a) to be used. Particularly when using for rolls and belts for OA equipment, it is preferable that an elastic modulus of the whole flexible fluorine-containing material is not more than $7 \times 10^8$ dyn/cm$^2$ at 150° C., particularly not more than $5 \times 10^8$ dyn/cm$^2$ at 150° C., thereby giving a good fixing property and color developing property even in applications for fuser rolls or belts, in which the tendency is toward high quality picture and coloring.

Examples of the usable perhaloolefin as a recurring unit of the elastomeric segment A are, for instance, tetrafluoroethylene (TFE), chlorotrifluoroethylene (CTFE), perfluorovinylethers such as perfluoro(alkyl vinyl ether) (alkyl group has 1 to 5 carbon atoms) (PAVE) and

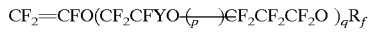

wherein Y is F or CF$_3$, R$_f$ is a perfluoroalkyl group having 1 to 5 carbon atoms, p is 0 or an integer of from 1 to 5, q is 0 or an integer of from 1 to 5, provided that p+q≧1, hexafluoropropylene (HFP), and the like. Among them, those having a combination and composition giving elastomeric property can be used. Further a monomer giving a curing site for peroxide crosslinking, polyol crosslinking, polyamine crosslinking and other curing reaction and a monomer having functional group for imparting adhesive property, etc. with other material may be introduced in an amount of not more than 10% by mole.

In the fluorine-containing multi-segment polymer (a) to be used in the present invention, the elastomeric segment A is a segment which is generally non-crystalline and has a glass transition temperature of not more than 25° C. Examples of the preferred composition thereof are, for instance, 50 to 85/15 to 50/0 to 10% by mole, particularly 50 to 80/20 to 50/0 to 5% by mole of TFE/PAVE/monomer giving a curing or adhering function.

Examples of the monomer giving a curing site are, for instance, vinylidene fluoride, CF$_2$=CHI, iodine-containing monomers represented by CX$_2$=CX—R$_f^3$CHRI, in which X is H, F or CH$_3$, R$_f^3$ is a linear or branched fluoro- or perfluoro-alkylene group or fluoro- or perfluoro-oxyalkylene group which may have at least one ether type oxygen atom, a fluoropolyoxyalkylene group or a perfluoropolyoxyalkylene group, R is H or CH$_3$, nitrile-containing monomers represented by:

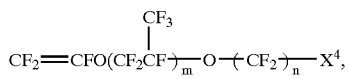

wherein m is from 0 to 5, n is from 1 to 3,

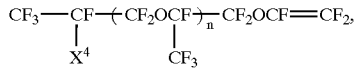

wherein n is from 1 to 4,

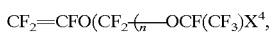

wherein n is from 2 to 5,

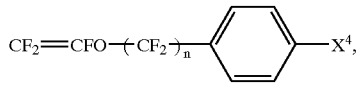

wherein n is from 1 to 6,

CF$_2$=CF[OCF$_2$CF(CF$_3$)]$_n$OCF$_2$CF(CF$_3$)X$^4$, wherein n is from 1 to 2, and

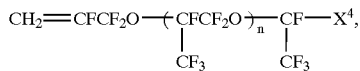

wherein X$^4$ is CN, COOH or COOR$^1$, in which R$^1$ is an alkyl group which has 1 to 10 carbon atoms and may contain fluorine atom, bromine-containing monomers, carboxyl group containing monomers, alkoxycarbonyl group-containing monomers, and the like. Usually the iodine-containing monomer, nitrile-containing monomer, carboxyl group-containing monomer, or the like is suitable.

A suitable iodine-containing monomer is a perfluoro (vinyl ether) compound from the viewpoint of its copolymerizability. For example, perfluoro(6,6 dihydro-6-iodo-3-oxa-1-hexene) and perfluoro(5-iodo-3-oxa-1-pentene) are suitable.

Other examples are fluorovinylethers described in JP-B-5-63482 which are represented by the formula:

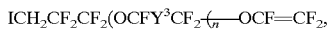

wherein Y$^3$ is a trifluoromethyl group, n is 0 or an integer of 1 to 2, and the like.

Examples of the monomer capable of giving good adhesion to other materials, e.g. metals such as aluminum and stainless steel and organic materials such as silicone rubber and polyimide, are non-fluorine-containing or fluorine-containing monomers having hydroxyl group, carboxyl group, carboxylic acid derivative, sulfonic acid, sulfonic acid derivative, epoxy group, acetyl group or the like.

In order to impart enough flexibility to rolls for OA equipment, particularly a fuser roll and a soft roll of pressure roll, it is preferable that the glass transition temperature of the elastomeric segment A in the fluorine-containing multi-segment polymer of the present invention is not more than 10° C.

The elastomeric segment A can be prepared by iodine transferring polymerization method known as a process for preparing a fluorine-containing rubber (JP-B-58-4728, JP-A-62-12734).

For example, there is a method of carrying out emulsion polymerization with stirring the above-mentioned perhaloolefin and if necessary, a monomer giving a curing site under pressure in water medium substantially under oxygen-free condition in the presence of an iodine compound, preferably a diiodine compound and a radical polymerization initiator.

Representative examples of the diiodine compound to be used are, for instance, 1–3-diiodoperfluoropropane, 1,4-diiodoperluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane Those compounds can be used alone or in a mixture thereof. Among them, 1,4-diiodoperfluorobutane is preferred. An amount of the diiodine compound is from 0.01 to 1% by weight based on the total weight of the elastomeric segment A.

A radical polymerization initiator which is used for preparing the elastomeric segment A of the present invention may be the same as that which has been used for polymerization of a fluorine-containing elastomer. Examples thereof are organic and inorganic peroxides and azo-compounds. Representative examples of the initiator are persulfates, carbonate peroxides, peroxide esters, and the like. Preferred initiator is ammonium persulfate (APS). The APS can be used alone or in combination with a reducing agent such as sulfites.

Though a wide range of emulsifying agents can be used for the emulsion polymerization, from a point of inhibiting a chain transfer reaction with the molecules of the emulsifying agent which occurs during the polymerization, carboxylic acid salts having a fluorocarbon chain or fluoropolyether chain are desirable. An amount of the emulsifying agent is desirably from about 0.05 to about 2% by weight, particularly desirably from 0.2 to 1.5% by weight based on added water.

Since the monomer mixture gas used in the present invention is explosive as described in Advances in Chemistry Series, G. H. Kalb et al, 129, 13 (1973), it is necessary to take measures for a polymerization equipment not to cause a sparking. From that point of view, it is preferable that a polymerization pressure is as low as possible.

The polymerization pressure can be changed in a wide range, generally in a range of from 0.5 to 5 MPa. The higher the polymerization pressure is, the more a polymerization speed increases. Therefore the polymerization pressure is desirably not less than 0.8 MPa from the viewpoint of increasing productivity.

It is preferable that a number average molecular weight of the thus obtained elastomeric segment A is from 5,000 to 750,000, particularly from 20,000 to 400,000 from the viewpoint of imparting flexibility, elasticity and mechanical properties to the whole fluorine-containing multi-segment polymer obtained.

An end of the thus obtained elastomeric segment A is of perhalo tppe and has an iodine atom which becomes a starting point of block copolymerization of the non-elastomeric segment B.

In the present invention, the non-elastomeric segment B is basically not limited if it has a fluorine atom and does not have the above-mentioned elastomeric property. The non-elastomeric segment B may be selected according to characteristics and functions which are intended to be obtained by block-copolymerizing the non-elastomeric segment B.

Among the monomers constituting the non-elastomeric. segment B, examples of the fluorine-containing monomer are, for instance, one or more of perhaloolefins such as TFE, CTFE, PAVE, HFP, $CF_2=CF(CF_2)_pX^3$ in which p is an integer of from 1 to 10, $X^3$ is F or Cl, and perfluoro-2-butene; and partly fluorinated olefins such as vinylidene fluoride (VdF), vinyl fluoride, trifluoroethylene, $$CH_2=CX^1-(CF_2)_q-X^2$$

in which $X^1$ and $X^2$ are H or F, q is an integer of from 1 to 10, and $CH_2=C(CF_3)_2$. Also one or more of monomers copolymerizable therewith, for example, ethylene, propylene, vinyl chloride, vinyl ethers, vinyl esters of carboxylic acid and acryls can be used as copolymerizable components.

Among them, from the viewpoint of chemical resistance and heat resistance, a sole use of fluorine-containing olefin, a combination of fluorine-containing olefins, a combination of ethylene and TFE and a combination of ethylene and CTFE are preferable as the monomers to be used as the main components. Particularly a sole use of perhaloolefin and the combination of perhaloolefins are preferable.

Examples thereof are (1) VdF/TFE (0 to 100/100 to 0), particularly VdF/TFE (70 to 99/30 to 1), TFE or PVdF;

(2) ethylene/TFE/HFP (6 to 43/40 to 81/10 to 30), 3,3,3-trifluoropropylene- 1,2-trifluoromethyl-3,3,3-trifluoropropylene-1/PAVE (40 to 60/60 to 40);

(3) TFE/$CF_2=CF-R_f^1$ (amount exhibiting non-elastomeric property, namely, an amount of $CF_2=CF-R_f^1$ is less than 15% by mole. $R_f^1$ is $CF_3$ or $OR_f^2$, in which $R_f^2$ is a perfluoro alkyl group having 1 to 5 carbon atoms);

(4) VdF/TFE/CTFE (50 to 99/30 to 0/20 to 1);

(5) VdF/TFE/HFP (60 to 99/30 to 0/10 to 1);

(6) ethylene/TFE (30 to 60/70 to 40);

(7) polychlorotrifluoroethylene (PCTFE);

(8) ethylenc/CTFE (30 to 60/70 to 40); and the like.

When heat resistance and abrasion resistance are required in case of a material for fuser rolls and belts in the field of OA equipment, it is preferable that a crystalline melting point of the non-elastomeric segment B is not less than 150° C. In case of a material for fuser rolls and belts particularly for high speed copying machine or printer, the crystalline melting point is particularly preferably not less than 250° C. Particularly from the viewpoint of good heat resistance, non-tackiness and abrasion resistance, the non-elastomeric fluorine-containing polymer chain segment having perhaloolefin as a main recurring unit is preferred.

Further it is particularly preferable that the non-elastomeric segment B in the fluorine-containing multi-segment polymer of the present invention is the polymer chain comprising more than 85% by mole and not more than 100% by mole of tetrafluoroethylene and 0% by mole or less than 15% by mole of the formula (1) represented by:

$$CF_2=CF-R_f^1 \tag{1}$$

wherein $R_f^1$ is $CF_3$ or $OR_f^2$, in which $R_f^2$ is a perfluoroalkyl group having 1 to 5 carbon atoms. The resulting polymer exhibits excellent characteristics such as heat resistance, abrasion resistance and non-tackiness against toner in case of use for rolls for OA equipment and fuser rolls.

An iodine atom at a molecular end of the fluorine-containing multi-segment polymer of the present invention can be replaced with another atom or organic group by various methods.

For example, the molecular end of the fluorine-containing multi-segment polymer of the present invention consisting of perhaloolefin can be fluorinated and replaced with —$CF_3$ group by treating the polymer with a fluorine gas.

Thereby non-tackiness, heat resistance, oil resistance and chemical resistance of the fluorine-containing multi-segment polymer can be enhanced more.

The treatment with fluorine gas is carried out by bringing the fluorine-containing multi-segment polymer of the present invention consisting of perhaloolefin into contact with a fluorine gas usually at 50° to 250° C., preferably at a temperature up to 200° C. for 1 to 10 hours, preferably for 2 to 5 hours. A treating pressure may be from 1 to 10 kgG/cm$^2$, usually an atmospheric pressure. The fluorine gas to be used may be a pure fluorine gas. From the viewpoint of safety, the fluorine gas diluted with an inert gas such as nitrogen gas, helium gas or argon gas to 2 to 25% by volume, preferably 7 to 15% by volume is preferred.

When brought into contact with the fluorine gas, the fluorine-containing multi-segment polymer (a) may be in any form of powder, pellet or flake. The polymer can be subjected to fluorination treatment after formed into a film, tube or other molded article.

To the non-elastomeric segment B or to the structure of the fluorine-containing multi-segment polymer (a) of the present invention, if necessary, a carboxyl group or its derivative, hydroxyl group, sulfonic acid group or its derivative, epoxy group or the like can be introduced by copolymerization of a monomer having functional group or by reaction of an end group of the segment polymer, and thereby adhesion to a substrate, crosslinkability and affinity for a filler can be enhanced and various other functions can be imparted.

Block copolymerization of the non-elastomeric segment B can be carried out subsequently to the emulsion polymerization of the elastomeric segment A by changing a monomer to one for the non-elastomeric segment B.

A number average molecular weight of the non-elastomeric segment B can be adjusted in a wide range of from 1,000 to 1,200,000, preferably from 3,000 to 600,000. An important feature of the present invention is to use the fluorine-containing multi-segment polymer in which the non-elastomeric segment B can be securely block-copolymerized with the elastomeric segment A and the molecular weight (degree of polymerization) of the non-elastomeric segment B can be increased. As mentioned above, this can be achieved by making the elastomeric segment A have perhaloolefin units of not less than 90% by mole, particularly not less than 95% by mole as a recurring unit.

The thus obtained fluorine-containing multi-segment polymer (a) mainly comprises polymer molecules (B—A—B) in which the non-elastomeric segments B are bonded to both sides of the elastomeric segment A and polymer molecules (A—B) in which the non-elastomeric segment B is bonded to one side of the elastomeric segment A. An amount of polymer molecules (C) which comprise only the elastomeric segment A without being bonded to the non-elastomeric segment B is not more than 20% by weight, preferably not more than 10% by weight based on the total amount of the segment A and polymer molecule (C) in the fluorine-containing multi-segment polymer.

When the polymer having the polymer molecule (C) in an amount exceeding 20% by weight is mixed to the fluorine-containing resin (b), mechanical properties and abrasion resistance of products and parts produced therefrom are lowered. Particularly in case of use for a roll and belt for OA equipment which are heated to 150° C. or more, an abrasion resistance particularly at high temperature is lowered.

The proportion of the elastomeric segment A and the non-elastomeric segment B in the fluorine-containing multi-segment polymer (a) of the present invention is optionally selected depending on kind of intended products and parts, for example, rolls and belts for OA equipment, required properties, etc. and also depending on the compositions of each segment. The proportion of the elastomeric segment A to the non-elastomeric segment B is preferably selected in the range of from 5:95 to 99:1 (% by weight). Particularly in case of use as a material for rolls at fixing part where flexibility, heat resistance and abrasion resistance are required, the proportion of the elastomeric segment A to the non-elastomeric segment B is preferably from 20:80 to 98:2 (% by weight), further preferably from 50:50 to 98:2 (% by weight).

Also in case of use, for example, for rolls and belts of OA equipment, if the proportion of the elastomeric segment A is too small, flexibility becomes insufficient and fixing property and color developing property become insufficient. If the proportion of the non-elastomeric segment B is too small, there is a tendency that heat resistance, mechanical properties at use at high temperatures and abrasion resistance become insufficient. When the proportion of the non-elastomeric segment B is not more than 30% by weight from the viewpoint of mold-processability, the segment polymer (a) having excellent mold-processability, particularly melt-moldability, melt-extrusion moldability and injection mold-ability can be provided. Particularly since the melt-extrusion moldability is excellent, a film or tube having a thickness of as thin as about 10 μm to about 500 μm and a smooth surface can be produced. From this point of view, it is further preferable that the proportion of the segment A to the segment B is from 70:30 to 98:2 (% by weight).

When a crosslinking point is provided by introducing a curing site in the elastomeric segment A, vulcanization (crosslinking) can be carried out by peroxide vulcanization with known organic peroxides, polyol vulcanization with known polyols, polyamine vulcanization with known polyvalent amine compounds, and the like.

Also the vulcanization can be carried out by a method of triazine crosslinking by forming a triazine ring with an organotin compound (for example, JP-A-58-152041), a method of oxazole crosslinking by forming an oxazole ring with bisaminophenol similarly by using a fluorine-containing elastomer having a nitrile group introduced as a crosslinking point (for example, JP-A-59-109546), a method of imidazole crosslinking by forming an imidazole ring with a tetraamine compound (for example, JP-A-59-109546) and a method of thiazole crosslinking by forming a thiazole ring with bisaminothiophenol (for example, JP-A-8-104789), or the like method.

Next, the fluorine-containing resin as the component (b) is explained below. The fluorine-containing resin (b) is naturally a substance different from the above-mentioned fluorine-containing multi-segment polymer (a).

The fluorine-containing resin (b) has a crystalline melting point or glass transition temperature of not less than 1 50° C. and possesses an ability of improving heat resistance and particularly mechanical properties at high temperatures without lowering the excellent non-tackiness and mechanical properties of the fluorine-containing multi-segment polymer (a).

The fluorine-containing resin is selected from those mentioned above depending on purpose and application of the flexible material of the present invention. When the flexible material is used as a surface material and molding material such as rolls of OA-related equipment, sealing materials for automotive-related parts and sealing materials for semiconductor producing equipment, the crystalline melting point or glass transition temperature thereof is not less than 150° C., more preferably not less than 250° C.

Among the fluorine-containing resins, perfluoro fluorine-containing resins having excellent heat resistance, non-tackiness, chemical resistance and friction property and capable of giving such properties to the flexible fluorine-containing material, particularly one or more of PTFE, PFA, FEP and EPA are preferable.

In the flexible fluorine-containing material of the present invention, the preferable weight ratio (a)/(b) of the component (a) to the component (b) can be selected in a wide range of from 1/99 to 99/1. Particularly in order to maintain flexibility sufficiently and provide mechanical properties and heat resistance, the weight ratio is 20/80 or more, particularly 30/70 or more, 40/60 to 99/1, 50/50 to 90/10, particularly 80/20 or less.

A combination of the fluorine-containing multi-segment polymer (a) and the fluorine-containing resin (b) is optionally selected. Particularly a selection of the fluorine-containing resin (b) having the same or similar components as those of the non-elastomeric segment B in the fluorine-containing multi-segment polymer (a) is preferable from the viewpoint of excellent compatibility between the both components.

For example, the following combinations are preferable.
A Composition Comprising:
  (a) Fluorine-containing multi-segment polymer
    Segment A: TFE/PAVE (PAVE: 30 to 50% by mole) copolymer
    Segment B: TFE/PAVE (PAVE: 0.5 to 5% by mole) copolymer
  (b) Fluorine-containing resin PFA,
A Composition Comprising:
  (a) Fluorine-containing multi-segment polymer
    Segment A: TFE/PAVE copolymer
    Segment B: TFE/HFP copolymer
  (b) Fluorine-containing resin FEP,
A Composition Comprising:
  (a) Fluorine-containing multi-segment polymer
    Segment A: TFE/PAVE copolymer
    Segment B: TFE homopolymer
  (b) Fluorine-containing resin
  A resin selected from PTFE, PFA, FEP and EPA, and
A Composition Comprising:
  (a) Fluorine-containing multi-segment polymer
    Segment A: TFE/PAVE copolymer
    Segment B: TFE/HFP/PAVE copolymer
  (b) Fluorine-containing resin
  A resin selected from EPA, PFA and FEP.

In case of the composition mainly comprising, for example, the fluorine-containing multi-segment polymer (a) and the fluorine-containing resin (b) (for example, PTFE or PTFE copolymer) which cannot be melt-molded, mixing thereof may be carried out by usual method of mixing PTFE containing a filler. The flexible fluorine-containing material of the present invention can be obtained by mixing with a mixer, for example, a tumbler mixer, Henschel mixer, or the like and is used as a molding material for compression molding, etc. In case of the composition mainly comprising the fluorine-containing multi-segment polymer (a) and the fluorine-containing resin (b) (for example, PFA, FEP, EPA, or the like) which are melt-moldable, melt-mixing is preferable. Examples of the melt-mixing equipment are a mixing roll, Banbury mixer, Brabender mixer, extruder and the like. Among them, the extruder is preferable from the points that a kneading power is larger and enhancement of a dispersibility can be expected more at blending the fluorine-containing multi-segment polymer (a) and the fluorine-containing resin (b) and that a productivity for producing the material is good. For mixing, the extruder having a single screw or two or more screws can be used, and particularly a two-screw extruder is preferred because a kneading power is large, thereby making it possible to obtain a composition having a good dispersibility and a kneading power can be controlled optionally.

The composition is generally formed into a pellet by the melt-mixing and is used as a molding material for melt-extrusion molding into a tube or film and injection molding. Further the composition is pulverized and can be used as a coating material.

To the flexible fluorine-containing material of the present invention can be mixed various fillers depending on purpose and applications.

Particularly when the flexible fluorine-containing material of the present invention is used as a material for rolls and belts of OA equipment which are represented by fuser rolls of a copying machine, printer, etc., fillers which can impart electric conductivity to the roll surface are mixed mainly.

Examples of the filler for imparting electric conductivity are carbon blacks (Ketjen Black, Acetylene Black, etc.); carbons such as PAN type carbon fiber, pitch type carbon fiber and pulverized expansive graphite; fluorinated carbons obtained by completely or partly fluorinating those carbons; metals such as Ag, Ni, Cu, brass, silver-plated copper, Zn, Al and stainless steel (in the form of powder, flake, fiber or the like); metal oxides in the form of fine particles such as $SnO_2$ (Sb dope), $In_2O_3$ (Sn dope) and ZnO (Al dope); ferrites; highly dielectric substances such as barium titanate; and the like.

An adding amount of the filler capable of imparting electric conductivity is optionally selected depending on a desired surface resistance or volume specific resistance of rolls or belts for OA equipment and further depending on kind of an electrically conductive filler to be used. The adding amount is from about 0.1 to 40% by weight, preferably from 1 to 30% by weight based on the whole composition comprising the flexible fluorine-containing material of the present invention and the filler.

Particularly a partly fluorinated carbon is preferred from the. points that the resistance can be controlled stably in a narrow range of from, $10^8$ to $10^{13}$ Ωcm and that electric conductivity can be given without lowering non-tackiness of the fluorine-containing polymer.

Examples of the preferred partly fluorinated carbon are those obtained by fluorinating carbon materials such as carbon black, carbon fiber, petroleum coke and graphite powder.

Among them, preferred is a fluorinated carbon black obtained by fluorinating carbon black, particularly a fluorinated carbon black having a ratio F/C of fluorine atom to carbon atom of not less than 0.1 and less than 1.0, particularly not less than 0.1 and less than 0.5.

If the F/C of the fluorinated carbon black is less than 0.1, an effect of the fluorination is insufficient and problems which a carbon material before the fluorination possesses remain unsolved, namely a problem that a ratio of change in resistance for an adding amount is very large and controlling of electric conductivity is difficult and a problem that dispersing of fluorinated carbon black becomes non-uniform due to a developed structure and the obtained composition becomes hard. If the F/C is not less than 1.0, a desired electric conductivity cannot be given to the composition.

The F/C is measured by the method mentioned below. The fluorinated carbon black is wrapped together with a combustion improver $Na_2O_2$ and a polyethylene film with a filtrating paper, and burnt in a tightly closed flask filled with oxygen. Hydrogen fluoride generated is measured by a usual method by using a fluoride ion meter (Ion Analyzer 901 available from Orion Co., Ltd.). A fluorine content is calculated from the obtained value. Then the F/C is calculated from the obtained fluorine content.

The fluorinated carbon black mainly comprises a poly (carbon monofluoride). Preferred is a fluorinated carbon black obtained by fluorinating a carbon black having an average particle size of from 0.01 to 50 $\mu$m, preferably from 0.01 to 1 $\mu$m with a fluorine gas. In case of a fluorinated carbon black obtained by using a carbon material having an average particle size exceeding 50 $\mu$m, for example, petroleum coke, graphite powder, carbon fiber, or the like as a starting material, an adding amount thereof has to be increased for imparting electric conductivity and non-tackiness to the resin, and disadvantages tend to arise, such as an increase in a surface roughness of the obtained composition, lowering of mechanical strength and non-uniform resistance.

The carbon materials suitable for the fluorinated carbon black are carbon blacks having an average article size in the above-mentioned range. Carbon blacks which can be used are those commercially available, for example, Furnace Black for rubber (for example, ASAHI #55 available from Asahi Carbon Co., Ltd., etc.), Channel Black for coloring (for example, LEBEN 7000 available from Columbia Carbon Co., Ltd.), Thermal Black (SEVACARBON MT-C1 available from Columbia Carbon Co., Ltd.), and the like.

Among the carbon blacks, particularly those generally called an electrically conductive carbon black are preferred. The electrically conductive carbon blacks are those defined by factors such as a smaller average particle size (not more than 0.1 $\mu$m), a large surface area ($N_2$ surface area: 50 $m^2$/g or more), a developed structure (oil absorption: 100 cc/g or more), a less content of impurities (ash content: less than 0.1%) and an advanced graphitization, and are widely used because even a relatively small amount thereof can impart electric conductivity to the material. Examples of the commercially available electrically conductive carbon black are, for instance, Ketjen Black EC and Ketjen Black EC-600JD (available from Ketjen Black International Co., Ltd.), Black Pearls 2000, Vulcan XC-72 and CSX-99 (available from Cablack Co., Ltd.), Denca Black (available from Denki Kagaku Kogyo Kabushiki Kaisha), Conductex 950 (available from Columbia Carbon Co., Ltd.), and the like.

The fluorinated carbon black can be obtained by contacting the above-mentioned carbon materials with a fluorine gas at a temperature within a range of from 200° to 600° C., preferably from 300° to 500° C. In a reaction temperature range lower than the mentioned i range, there occur the problems that a progress of the fluorination reaction is slow, a degree of the fluorination is hardly increased, a thermal stability is not sufficient and the properties inherent to the fluorinated carbon black such as non-tackiness and lubricity are not exhibited. On the contrary, in a reaction temperature range higher than the mentioned range, a thermal cracking reaction easily arises and a yield of an obtained fluorinated carbon black is decreased. Also there is a case where a sudden thermal cracking occurs, resulting in an explosion. Therefore attention must be paid to that.

The fluorine gas to be used for the reaction may be diluted with an inert gas such as nitrogen, argon, helium, carbon tetrafluoride, or the like or may contain hydrogen fluoride. The reaction can be carried out under normal pressure, and even if the reaction is carried out under reduced pressure or under pressure, there is no problem.

Besides the above-mentioned conditions, a reaction time, a fluorine gas flow, etc. may be optionally adjusted depending on a reactivity of the starting carbon material with fluorine and a desired F/C value (fluorine content).

The proportion of the fluorine-containing multi-segment polymer of the present invention to the fluorinated carbon is optionally selected depending on a desired resistance, and is from 1/99 to 20/80 (weight ratio, hereinafter the same). If an amount of the fluorinated carbon black becomes small, an effect of the addition thereof is not sufficiently obtained, and if the amount becomes too large, there is a tendency that a mechanical strength such as a tensile strength is lowered.

Further a filler for enhancing mechanical properties and compression restoration property may be mixed to the composition. Typical examples of the preferable filler are fibrous fillers such as a glass fiber, carbon fiber, asbestos fiber and potassium titanate fiber.

Examples of rolls for OA equipment, to which the flexible fluorine-containing material of the present invention having heat resistance and non-tackiness is applied, are as follows.

Roll Example 1
(i) Metallic core roll of aluminum or stainless steel
(ii) Fluorine-containing material of the present invention which comprises 40 to 99% by weight of the fluorine-containing multi-segment polymer (a) comprising, as the elastomeric segment A, not less than 75% by weight of one or more segments comprising a polymer chain having a molecular weight of 5,000 to 750,000 and obtained by copolymerizing 50 to 85% by mole of tetrafluoroethylene with 15 to 50% by mole of perfluoro(alkyl vinyl ether) and as the non-elastomeric segment B, 25% by weight of one or more segments comprising a polymer chain having a molecular weight of 3,000 to 1,200,000 and obtained by polymerizing more than 85% by mole and not more than 100% by mole of tetrafluoroethylene with 0% by mole or less than 15% by mole of the formula (1):

$$CF_2=CF-R_f^1 \qquad (1)$$

wherein $R_f^1$ is $CF_3$ or $-OR_f^2$, in which $R_f^2$ is a perfluoroalkyl group having 1 to 5 carbon atoms, and 1 to 60% by weight of the fluorine-containing resin (b), preferably a perfluoro polymer having a crystalline melting point or glass transition temperature of not less than 150° C. Fuser roll or pressure roll at a fixing part which is produced by laminating (ii) as an outer layer of (i).

Roll Example 2
(i) Metallic core roll of aluminum or stainless steel
(ii) Composition prepared by mixing a filler capable of imparting electric conductivity to the fluorine-containing multi-segment polymer described in (ii) (outer layer) of Roll Example 1 Fuser roll or pressure roll at a fixing part which is produced by laminating (ii) as an outer layer of (i).

The fluorine-containing material of the present invention itself has flexibility and therefore even if laminated directly on the metallic core roll as described in the above-mentioned Roll Examples 1 and 2, enough flexibility can be obtained. In addition, by providing an elastic layer of silicone rubber, fluorine-containing rubber, urethane rubber, EPDM or the like, the roll can be endowed with more flexibility and effectively comply with requirements for higher quality picture and paper feeding property at high speed. Among them, the elastic layers having a rubber hardness of 10 to 40 degrees or not more than 10 degrees (including a layer in the form of sponge) are selected.

Roll Example 3
(i) Metallic core roll of aluminum or stainless steel
(ii) Silicone rubber
(iii) Flexible fluorine-containing material described in (ii) (outer layer) of Roll Example 1

Fuser roll or pressure roll at a fixing part which is produced by laminating the silicone rubber layer (ii) on the core roll (i) and thereon the layer (iii) as an outermost layer.

Roll Example 4
(i) Metallic core roll of aluminum or stainless steel
(ii) Silicone rubber
(iii) Composition prepared by mixing a filler capable of imparting electric conductivity to the fluorine-containing material described in (ii) (outer layer) of Roll Example 1

Fuser roll or pressure roll at a fixing part which is produced by laminating the silicone rubber layer (ii) on the core roll (i) and thereon the layer (iii) as an outermost layer.

Between each layer of each layered roll of the above-mentioned Roll Examples 1 to 4, an adhesive or primer may be used to improve adhesion thereof.

Preferred are Roll Examples 3 and 4. Usually any one of the fuser roll or pressure roll of the fixing part or the both of them are provided with a heating device such as a ceramic heater to soften or melt a toner for fixing an image to a paper. The material of the present invention has enough heat resistance against such a heating device.

The flexible fluorine-containing material of the present invention is used as a molding material which can be molded into the form of sheet, film or tube and thus is applied on the roll or belt for OA equipment. In that case, known molding methods can be used. The fluorine-containing multi-segment polymer or the composition prepared by blending a filler to the fluorine-containing multi-segment polymer can be molded into necessary forms by extrusion molding, injection molding, compression molding or the like.

Further the flexible fluorine-containing material of the present invention can be used as a coating material when prepared into a composition containing a liquid carrier or into a powder form having a specific particle size and apparent density. The coating material can be used not only for application in OA equipment but also for a lining material, roll, belt, hose, sealing material, and the like in the fields of transportation such as automobiles, semiconductor production facilities, chemical plant, aircraft, food processing facilities, photographic and printing facilities, coating apparatuses, steel making facilities, etc. The coating material comprises the above-mentioned fluorine-containing multi-segment polymer (a) and the fluorine-containing resin (b). As the fluorine-containing multi-segment polymer (a) and the fluorine-containing resin (b), those described above in the heat resistant material for OA equipment having flexibility can be preferably used similarly. The coating material is applied on the rolls and belts for OA equipment and substrates in other applications and a coating film having excellent flexibility, sealing property, heat resistance, abrasion resistance and non-tackiness can be obtained.

Further the flexible fluorine-containing material of the present invention can be applied on the coating powder. For the coating powder, the same material as the above-mentioned heat resistant material for OA equipment having flexibility can be preferably used. The coating powder which is used preferably is in the form of powder or particle having a particle size of from 10 to 1,000 $\mu$m and an apparent density of from 0.3 to 1.2 g/cc.

To the coating powder can be optionally added additives, for example, a pigment such as a carbon powder, titanium oxide or cobalt oxide; a reinforcing material such as a glass fiber powder, carbon fiber powder or mica; an amine type anti-oxidant, organic sulfuric compound, organotin type anti-oxidant, phenolic anti-oxidant or a thermal stabilizer such as metal soap; a leveling agent; an anti-static agent; the same filler as mentioned above which is capable of imparting electric conductivity; and the like in the range not lowering remarkably characteristics of the fluorine-containing resin such as heat resistance.

Mixing of the coating powder to the above-mentioned additives may be carried out in the form of powder (dry type) or in the form of slurry (wet type). Preferred is the mixing in the form of powder. Examples of the usable mixing equipment are, for instance, usual mixers such as a sand mill, V-type blender and ribbon type blender and pulverizing machine.

The coating powder is generally coated through electrostatic coating, fluid bed dipping, rotary lining or the like and then baked (preferably at a temperature of not less than a crystalline melting point thereof) to form a good coating film.

Generally it is possible to form a coating film of from 10 to 200 $\mu$m thick in case of the electrostatic powder coating and from 200 to 1,000 $\mu$m thick in case of the rotary lining.

The flexible fluorine-containing material of the present invention can be formed into a coating composition by mixing to a liquid medium. For the coating composition, the same flexible fluorine-containing materials as those for the above-mentioned heat resistant material for OA equipment having flexibility can be preferably used.

The liquid carrier to be used for the coating composition is selected from liquids which can dissolve or disperse the fluorine-containing multi-segment polymer (a) and the fluorine-containing resin (b) constituting the flexible fluorine-containing material of the present invention. Examples thereof are alcohols such as methanol, ethanol, propanol and butanol and in addition, hydrocarbon type solvents such as acetone, methyl ethyl ketone, ethyl acetate, dimethylformamide, dimethylacetamide, N-methyl-2-pyrrolidone, dimethylsulfoxide, triethylphosphate, tetrahydrofuran, methyl isobutyl ketone, cyclohexanone, 1,4-dioxane, methyl cellosolve acetate, 2-nitropropane, methyl isoamyl ketone, 4-methoxy-4-methylpentanone-2 and 4-methoxy-4-methylpentanol-2; haloalkanes such as trichlorotrifluoroethane, dichlorotetrafluoroethane, dichlorodifluoroethane, chlorodifluoroethane, dichloropentafluoropropane, tetrachlorohexafluorobutane and perfluorohexane; fluorine-containing solvents such as fluorine-containing ethers, i.e. FLORINATE FC-75 (available from Three M Co., Ltd.), FLORINATE FC-77 (available from Three M Co., Ltd.) and HFE7100 (available from Three M Co., Ltd.); water; and a mixture of two or more thereof.

Also it is possible to blend usual additives such as a pigment, surfactant, anti-foaming agent, viscosity control agent and leveling agent in the range not lowering remarkably heat resistance, chemical resistance, non-tackiness and abrasion resistance.

Besides the additives, a coupling agent can be used as another component to enhance adhesive property.

The coupling agent means a compound which acts on an interface between the organic material and the inorganic material and forms a strong bridge between the both materials through chemical or physical coupling. The coupling agent is usually a compound of silicone, titanium, zirconium, hafnium, trium, tin, aluminum or magnesium which has a group capable of coupling the organic material and the inorganic material. Among those coupling agents, preferred are a silane coupling agent, ortho-acid esters of transition elements (for example, titanium or zirconium) of the group IV in Periodic Table and derivatives thereof, and particularly preferred is an amino silane compound.

The coating composition can be in the form of aqueous dispersion, organic solvent dispersion, organosol or aqueous emulsion of organosol containing the flexible fluorine-containing material of the present invention and if necessary, the above-mentioned additives. Among them, the form of aqueous dispersion for a coating is preferred from environmental and safety point of view. Particularly preferred is the composition in the state of the fluorine-containing multi-segment polymer being dispersed in water in the form of fine particles of from 0.01 to 1.0 µm, in which a surfactant is generally blended for stabilizing the dispersion.

The aqueous dispersion for a coating can be prepared through various processes. Concretely there are, for example, a process for finely pulverizing a powder of fluorine-containing multi-segment polymer obtained by suspension polymerization, or the like, mixing the finely pulverized powder to the fluorine-containing resin powder and then dispersing the mixture uniformly in an aqueous medium with a surfactant, a process for preparing an aqueous dispersion of fluorine-containing multi-segment polymer at the same time of polymerization by emulsion polymerization, mixing, thereto, the fluorine-containing resin fine powder or an aqueous dispersion of fluorine-containing resin obtained by emulsion polymerization and if necessary, adding a surfactant and additives, and the like process. From the viewpoint of productivity and quality (for forming into smaller and uniform particle size), the process for preparing the aqueous dispersions of both the fluorine-containing multi-segment polymer (a) and the fluorine-containing resin (b) directly through the emulsion polymerization and then mixing the both dispersions is preferred.

A method of coating of the coating composition is optionally selected depending on kind of the fluorine-containing multi-segment polymer, form of a coating, purpose and application. For example, in case of the aqueous dispersion and organic solvent dispersion, usually spray coating, brush coating, roll coating and spin coating are carried out. After the coating, drying and sintering are carried out to give a coating film on a substrate. The sintering conditions are optionally selected depending on kind (composition, melting point, etc.) of the fluorine-containing multi-segment polymer (a) and the fluorine-containing resin (b). Generally the sintering is carried out at a temperature of not less than the melting point of the non-elastomeric segment B in the fluorine-containing multi-segment polymer (a) and not less than the melting point of the fluorine-containing resin (b). The sintering time is from five minutes to three hours, preferably from about 10 minutes to about 30 minutes while it varies depending on the sintering temperature.

Such a coating material is coated on a metallic core roll (aluminum and SUS) of a roll as a heat resistant material for OA equipment having flexibility in the same manner as mentioned above or on an elastic layer of silicone rubber, fluorine-containing rubber, urethane rubber or EPDM provided on the core roll, and thus a fuser roll or pressure roll having not only flexibility, heat resistance and abrasion resistance but also excellent non-tackiness and oil resistance can be obtained.

In order to obtain the above-mentioned rolls for OA equipment by applying the coating material, after applying, if necessary, a primer to the metallic core roll or intermediate elastic layer and then sintering depending on necessity, it is possible to coat any of the aqueous dispersion coating, solvent-soluble coating, solvent-dispersion coating or powder coating comprising the coating material of the present invention by the above-mentioned method and then sinter at a temperature of not less than a melting point thereof to form a coating film. The thickness of the coating film varies depending on purpose, application and hardness of a substrate, and is selected in the range of from 1 to 500 µm, preferably from 5 to 150 µm, particularly from 5 to 100 µm. If necessary, the coating film may be ground to make its surface smooth. It is preferable to adjust a surface roughness (Ra) to not more than 2.0 µm, more preferably not more than 1.0 µm.

Also there is another method of producing rolls for OA equipment, that is, a method of producing a tube from the flexible fluorine-containing material of the present invention and covering a metallic core roll with the obtained tube. The tube is a cylindrical article obtained by molding the flexible fluorine-containing material into a tubular form. The above-exemplified flexible fluorine-containing material can be preferably used similarly.

A size of the tube varies depending on purpose, application and method of use, and is not limited. There is usually used a tube having an inner diameter of about 5 to 50 mm and a thickness of not more than 1 mm. Particularly in case of rolls for OA equipment such as fuser rolls and pressure rolls, the inner diameter and thickness are preferably from 10 to 40 mm and from 0.01 to 0.15 µm, respectively.

The tube is formed into a tube by usual melt-extrusion. The tube may be stretched (single screw or two screws) if necessary and may have thermal shrinkability, but usually may have neither stretchability nor thermal shrinkability.

The tube may contain the above-mentioned filler imparting electric conductivity if necessary. The tube can be produced usually by mixing previously an electric conductivity-imparting agent by kneading or dry blending to the starting material (in the form of pellet or powder) before molding into the tube by melt-extrusion.

The molding method is also not limited particularly. Generally melt extrusion molding with a ring die is carried out as mentioned above. Namely a cylindrical film melt-extruded through a ring die with a single screw or multi-screw extruder is taken off while being cooled as it is with a proper cooling means or is taken off while adjusting its size and shape toward inside or outside by using a sizing jig after the ring die and cooling at normal temperature or with a coolant such as air or water. In that case, there is no restriction in employing such conditions as feeding of air into the cylindrical article, stretching somewhat at the time of taking off and carrying out slow cooling or rapid cooling.

The tube usually comprises one layer, and may comprise two or more layers. In such a case, it is necessary to study enough and select compatibility between polymers of each layer and a heating temperature under specific conditions mentioned below. This is because a heat treating temperature of each layer differs from each other. Molding is carried out by co-extrusion method, and there are no specific conditions like the molding of one layer.

The tube is optionally subjected to inner surface treatment, if necessary, in order to enhance adhesion to an article to be covered with the tube. Example of the preferred inner surface treatment is chemical etching treatment, and for example, sodium-based etching agent is used preferably. In addition to the chemical etching, any of inner surface treatments may be employed as far as enhancement of adhesion can be expected. Further after the chemical etching of the inner surface, a primer may be applied to enhance adhesion to a substrate more.

The tube produced by using the material of the present invention is used for rolls (particularly for fuser roll and pressure roll) for OA equipment and can impart excellent flexibility and heat resistance to the rolls. In addition to those characteristics, good non-tackiness can be given by fitting the tube on an outermost surface of the roll.

The roll provided with the tube may be produced as mentioned above by covering its metallic core roll directly with the tube or by providing an elastic layer of silicone rubber, fluorine-containing rubber, urethane rubber or EPDM between the metallic core roll and the tube.

While the tube can impart enough flexibility to the roll surface even if covered directly on the metallic core roll, more flexibility can be given to the roll surface by providing the elastic layer between the core roll and the tube, and in case of use as a fuser roll and pressure roll for OA equipment, a higher quality picture and enhanced paper feeding property at high speed can be attained. In that case, an elastic layer having a rubber hardness of from about 10 degrees to about 30 degrees or an elastic layer having a rubber hardness of not more than 10 degrees (including a layer in the form of sponge) is preferred.

If necessary, an adhesive is used or treatment with a primer is carried out to impart adhesion between the tube and the substrate (metallic core roll or elastic layer) contacting thereto. In that case, it is preferable to use the above-mentioned tube subjected to the inner surface treatment by etching from the point that a stronger adhesion can be obtained.

In producing the roll by providing the tube directly on the metallic core roll, known methods can be optionally employed. It is preferable that a tube having thermal shrinkability and subjected to etching treatment of its inner surface is covered on a metallic core roll subjected to primer treatment and is shrunk at a temperature of not more than a melting point (for example, at 150° to 200° C.) for setting to the substrate, followed by sintering at a temperature of not less than the melting point (for example, at 320° to 400° C.) to bond by fusion.

The roll having an elastic layer between the tube and the metallic core roll can be produced by a method of firstly putting the metallic core roll and the tube in a cylindrical molded article so that a space is provided between the core roll and the tube and the inner surface of the cylindrical molded article comes into contact with the outer surface of the tube, and then pouring a raw rubber, latex or elastomer into the above-mentioned space, and if necessary carrying out vulcanizing. It is a matter of course that the roll covered with the tube has to be taken out of the cylindrical molded article at a necessary time. In that case, the inner surface of the tube may be previously subjected to etching treatment or primer treatment so that it is easily contacted to the rubber portion. Also a rubber roll may be produced previously and then covered with the tube on the surface of the rubber roll. In that case, it is better to use a tube having thermal shrinkability. Thus there is no restriction in the production method of the roll.

When the roll obtained above is used as rolls for OA equipment such as a fuser roll and pressure roll, a step for making the surface of roll smooth may be carried out as the case demands.

For example, a surface roughness (Ra) of the roll can be decreased by grinding the roll surface. Preferred Ra is not more than 2 $\mu$m, more preferably not more than 1.0 $\mu$m.

Further the flexible fluorine-containing material of the present invention can be used in various applications other than the application for OA equipment, by making use of its heat resistance, chemical resistance, non-tackiness, flexibility, sealing property and abrasion resistance. Examples of the application are shown in Tables 1, 2 and 3.

TABLE 1

| Field of industry | Sub-field of industry | Final product | Equipment |
|---|---|---|---|
| Electrical | Semi-conductor | Semi-conductor production apparatus | CVD equipment |
| | | Liquid crystal panel production apparatus | Dry etching equipment |
| | | Plasma panel production apparatus | Wet etching equipment |
| | | | Oxidation and diffusion equipment |
| | | | Sputtering equipment |
| | | | Ashing equipment |
| | | | Cleaning equipment |
| | | | Ion implantation equipment |
| Transportation | Vehicle | Car | Engine and auxiliary equipment |
| | | | AT |
| | | | Fuel line and auxiliary equipment |
| | Aircraft | Aircraft | Fuel line |
| | Rocket | Rocket | Fuel line |
| | Ship | Ship | Fuel line |

| Parts |
|---|
| ○ (square) ring, packing, sealing material, tube, roll |
| Coating, lining, gasket, diaphragm, hose |
| Gasket, shaft seal, valve stem seal, sealing material, hose |
| Hose, sealing material |
| ○ (square) ring, tube, packing, core material of valve, hose, sealing material, diaphragm |
| Diaphragm, ○ (square) ring, valve, tube, packing, hose, sealing material |
| Diaphragm, ○ (square) ring, valve, tube, packing, hose, sealing material |
| Diaphragm, ○ (square) ring, valve, tube, packing, hose, sealing material |

| | | | |
|---|---|---|---|
| Chemical | Chemical products | Plant | Production line of chemicals such as pharmaceutical, agricultural chemical, coating and resin (Petroleum) |
| | Chemicals | Pharmaceuticals | Plug for chemicals |
| Mechanical | Photograph | Developing machine | Film developing machine |
| | | | X-ray film developing |
| | Printing | Printing machine | Printing roll |
| | Coating | Coating facilities | Coating roll |
| | Analyzer and physical and chemical appliances | | |
| Food | Plant | | Food processing |

TABLE 1-continued

| Metal | Steel making | Steel sheet processing facilities | Steel sheet processing roll line |
|---|---|---|---|
| Lining, valve, packing, roll, hose, diaphragm, ○ (square) ring, tube, sealing material | | | |
| Plug for chemicals | | | |
| Roll | | | |
| Roll | | | |
| Roll | | | |
| Roll | | | |
| Tube | | | |
| Lining, valve, packing, roll, hose, diaphragm, ○ (square) ring, tube, sealing material | | | |
| Roll | | | |

TABLE 2

| Field of Industry | Characteristics Required |
|---|---|
| Electrical | Plasma resistance, acid resistance, alkali resistance, amine resistance, ozone resistance, gas resistance, chemical resistance, cleanliness, heat resistance |
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance, |
| | Chemical resistance, solvent resistance, heat resistance, |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Field of industry | Parts |
|---|---|
| Electrical | ○ ring and sealing material for gate valve of corresponding product or equipment |
| | ○ ring and sealing material for quartz window of corresponding product or equipment |
| | ○ ring and sealing material for chamber of corresponding product or equipment |
| | ○ ring and sealing material for gate of corresponding product or equipment |
| | ○ ring and sealing material for bell jar of corresponding product or equipment |
| | ○ ring and sealing material for coupling of corresponding product or equipment |
| | ○ ring and sealing material for pump of corresponding product or equipment |
| | ○ ring and sealing material for gas controller for semiconductor of corresponding product or equipment |
| | ○ ring and sealing material for resist developing and releasing solutions |
| | ○ ring and sealing material for wafer cleaning solution |
| | Diaphragm of pump for corresponding production equipment |
| | Hose for resist developing and releasing solutions |
| | Hose and tube for wafer cleaning solution |
| | Roll for transferring wafer |
| | Lining and coating of tanks for resist developing and releasing solutions |
| | Lining and coating of tanks for wafer cleaning solution |
| | Lining and coating of tanks for wet etching |
| Transportation | Engine head gasket |
| | Metal gasket |
| | Crank shaft seal |
| | Cam shaft seal |
| | Valve stem seal |
| | Manifold packing |
| | Oil hose |
| | ATF hose |
| | Injector ○ ring |
| | Injector packing |
| | ○ ring and diaphragm for fuel pump |
| | Fuel hose |
| Chemical | |
| Mechanical | Developing roll |
| | Developing roll |
| | Gravure roll |
| | Guide roll |
| | Gravure roll for magnetic tape production and coating line |
| | Guide roll for magnetic tape production and coating line |
| | Various coating rolls |
| Food | |
| Metal | |

The present invention is then explained based on examples and preparation examples but is not limited to those examples.

PREPARATION EXAMPLE 1

Preparation of Fluorine-containing Multi-segment Polymer

Synthesis of Elastomeric Segment A

A 47-liter stainless steel autoclave having no ignition source was charged with 30 liters of pure water, 300 g of $C_7F_{15}COONH_4$ as an emulsifying agent and 2.7 g of disodium hydrogenphosphate. $12H_2O$ as a pH control agent, and after the inside of a system was sufficiently replaced with nitrogen gas, the autoclave was heated up to 50° C. with stirring at 200 rpm and a gas mixture of TFE and perfluoro (methyl vinyl ether) (PMVE) (32/68 in mole ratio) was introduced (780 g of a monomer mixture) so that the inside pressure became 8.0 kgf/cm²G. Then 100 ml of an aqueous solution of ammonium persulfate (APS) having a concentration of 37.2 mg/ml was fed with pressurized nitrogen gas to initiate a reaction.

At the time when the inside pressure lowered down to 7.0 kgf/cm²G with advance of the polymerization, 18.21 g of diiodine compound $I(CF_2)_4I$ and 234 g of an aqueous solution of 10% by weight of $C_7F_{15}COONH_4$ were introduced with pressurized nitrogen gas. Then 60 g of TFE was fed with self-pressure thereof and 58 g of PMVE was fed under pressure with a plunger pump (TFE/PMVE=63/37 in mole ratio) so that the pressure became 8.0 kgf/cm²G. Thereafter TFE and PMVE were fed in the same manner under pressure with the advance of the reaction, and thus increasing and lowering of the pressure were repeated between 7 kgf/cm²G and 8 kgf/cm²G.

When a total charging amount of TFE and PMVE reached 5,900 g twelve hours after starting of the polymerization reaction, the autoclave was cooled and un-reacted monomers were released to obtain an aqueous dispersion having a solid content of 16.0% by weight.

A part of the aqueous dispersion was sampled, frozen, coagulated and thawed, followed by washing a coagulated product with water and then vacuum-drying to obtain a rubber-like polymer. A Mooney viscosity $ML_{1+10}$ (140° C.) of the polymer was 58.

As a result of $^{19}F$-NMR analysis, monomer components of the polymer were TFE/PMVE=61/39% by mole, and Tg (center value) measured according to DSC analysis was 2° C.

Block Copolymerization with Non-elastomeric Segment B

The same 47-liter stainless steel autoclave as above was charged with 3,200 g of the aqueous dispersion obtained above, 142 g of perfluoro(propyl vinyl ether) (PPVE) and 400 g of pure water. After replacing the inside of a system was sufficiently replaced with nitrogen gas, the inside temperature was kept at 50° C. With stirring at 120 rpm, tetrafluoroethylene was introduced under pressure so that the inside pressure became 5.5 kgf/cm²G (amount of tetrafluoroethylene: 400 g).

Then a solution prepared by dissolving 0.4 g of ammonium persulfate in 50 ml of water was introduced with pressurized nitrogen gas to initiate a reaction.

Since the inside pressure lowered down with the advance of the polymerization reaction, at the time when it lowered to 5.0 kgf/cm²G, it was again raised with a tetrafluoroethylene gas up to 5.5 kgf/cm²G, and thus increasing and lowering of the pressure were repeated.

At the time when 950 g of tetrafluoroethylene was consumed after starting of the polymerization, supplying thereof was stopped, the autoclave was cooled and un-reacted monomers were released to obtain 6,000 g of a semi-transparent aqueous dispersion.

The polymer content of the obtained aqueous dispersion was 18.3% by weight, and the particle size thereof measured by dynamic light scattering method was 58 nm.

The proportion of the non-elastomeric fluorine-containing polymer chain segment B to the whole polymer which was calculated from an increase in yield of the polymer, namely, ((Yield of polymer obtained in post polymerization)–(Amount of polymer charged))÷(Yield of polymer obtained in post polymerization)×100 was 17% by weight.

The obtained aqueous dispersion was frozen and coagulated, and the precipitated polymer was washed and dried to obtain a white solid.

The white solid powder was charged in an electric oven maintained at 230° C., and the inside of the oven was replaced with nitrogen gas, followed by flowing of 20% by volume of fluorine gas (nitrogen gas: 80% by volume) at a rate of 0.5 liter/min for five hours. After that, the inside of the oven was sufficiently replaced with nitrogen gas and the oven was cooled to obtain a fluorinated fluorine-containing multi-segment polymer (white powder).

According to $^{19}F$-NMR analysis, components of the non-elastomeric fluorine-containing polymer chain segment B in the obtained fluorine-containing multi-segment polymer was TFE/PPVE=98/2% by mole. Also according to DSC analysis, the glass transition temperature of the elastomeric fluorine-containing polymer chain was 2° C. and the crystalline melting point of the non-elastomeric fluorine-containing polymer chain segment was 282° C. The melt flow rate measured under conditions of preheating at 372° C. for five minutes at a load of 5 kgf/cm² by using Koka-type flow tester and nozzles of 2 mm diameter×8 mm length was 4.9 g/10 min.

PREPARATION EXAMPLE 2

Preparation of Fluorine-containing Multi-segment Polymer

Synthesis of Elastomeric Segment A

A 47-liter stainless steel autoclave having no ignition source was charged with 30 liters of pure water, 300 g of $C_7F_{15}COONH_4$ as an emulsifying agent and 2.7 g of disodium hydrogenphosphate.12H₂O as a pH control agent, and after the inside of a system was sufficiently replaced with nitrogen gas, the autoclave was heated up to 50° C. with stirring at 200 rpm and a gas mixture of TFE/PMVE (32/68 in mole ratio) was introduced so that the inside pressure became 8.0 kgf/cm²G (monomer mixture: 787 g). Then 100 ml of an aqueous solution of ammonium persulfate (APS) having a concentration of 68.6 mg/ml was fed with pressurized nitrogen gas to initiate a reaction.

At the time when the inside pressure lowered down to 7.0 kgf/cm²G with the advance of the polymerization, 27.2 g of diiodine compound $I(CF_2)_4I$ and 234 g of an aqueous solution of 10% by weight of $C_7F_{15}COONH_4$ were introduced with pressurized nitrogen gas. Then 60 g of TFE was fed with self-pressure thereof and 58 g of PMVE was fed under pressure with a plunger pump (TFE/PMVE=63/37 in mole ratio) so that the pressure became 8.0 kgf/cm²G. Thereafter TFE and PMVE were fed in the same manner under pressure with the advance of the reaction, and thus increasing and lowering of the pressure were repeated between 7 kgf/cm²G and 8 kgf/cm²G.

When the total charging amount of TFE and PMVE reached 6,000 g sixteen hours after starting of the polymerization reaction, the autoclave was cooled and un-reacted monomers were released to obtain an aqueous dispersion having the solid content of 16.6% by weight.

A part of the aqueous dispersion was sampled, frozen, coagulated and thawed, followed by washing a coagulated product with water and then vacuum-drying to obtain a rubber-like polymer. The Mooney viscosity $ML_{1+10}$ (100° C.) of the polymer was 59 and the Mooney viscosity $ML_{1+10}$ (140° C.) of the polymer was 12.

As a result of $^{19}F$-NMR analysis, monomer components of the polymer were TFE/PMVE=64/36% by mole, and Tg (center value) measured according to DSC analysis was 3° C.

Block Copolymerization with Non-elastomeric Segment B

The same 47-liter stainless steel autoclave as above was charged with 1,840 g of the aqueous dispersion obtained above, 208 g of perfluoro(propyl vinyl ether) (PPVE) and 1,200 g of pure water. After the inside of a system was sufficiently replaced with nitrogen gas, the inside temperature, was kept at 50° C. With stirring at 120 rpm, tetrafluoroethylene was introduced under pressure so that the inside pressure became 5.5 kgf/cm²G (amount of tetrafluoroethylene: 640 g).

Then the solution prepared by, dissolving 0.27 g of ammonium persulfate in 50 ml of water was introduced with pressurized nitrogen gas to initiate a reaction.

Since the inside pressure lowered down with the advance of the polymerization reaction, at the time when it lowered to 5.0 kgf/cm²G, it was again raised with a tetrafluoroethylene gas up to 5.5 kgf/cm²G, and thus increasing and lowering of the pressure were repeated.

At the time when 1,400 g of tetrafluoroethylene was consumed after starting of the polymerization, supplying thereof was stopped, the autoclave was cooled and un-reacted monomers were released to obtain 4,000 g of a semi-transparent aqueous dispersion.

The polymer content of the obtained aqueous dispersion was 21.0% by weight, and the particle size thereof measured by dynamic light scattering method was 59 nm.

The proportion of the non-elastomeric fluorine-containing polymer chain segment B to the whole polymer which was calculated from an increase in yield of the polymer, namely, ((Yield of polymer obtained in post polymerization)−(Amount of polymer charged))÷(Yield of polymer obtained in post polymerization)×100 was 33% by weight.

The obtained aqueous dispersion was frozen and coagulated, and the precipitated polymer was washed and dried to obtain a white solid.

The white solid powder was charged in an electric oven maintained at 230° C., and the inside of the oven was replaced with nitrogen gas, followed by flowing of 20% by volume of fluorine gas (nitrogen gas: 80% by volume) at a rate of 0.5 liter/min for five hours. After that, the inside of the oven was replaced with nitrogen gas sufficiently and the oven was cooled to obtain a fluorinated fluorine-containing multi-segment polymer (white powder).

According to $^{19}$F-NMR analysis, components of the non-elastomeric fluorine-containing polymer chain segment in the obtained fluorine-containing multi-segment polymer was TFE/PPVE=98/2% by mole. Also according to DSC analysis, the glass transition temperature of the elastomeric fluorine-containing polymer chain was 3° C. and the crystalline melting point of the non-elastomeric fluorine-containing polymer chain segment was 297° C. The melt flow rate measured under conditions of preheating at 372° C. for five minutes at a load of 5 kgf/cm² by using Koka-type flow tester and nozzles of 2 mm diameter×8 mm length was 3.5 g/10 min.

EXAMPLE 1

The white solid of fluorine-containing multi-segment polymer prepared in Preparation Example 1 and PFA (NEOFLON PFA AP201 available from DAIKIN INDUSTRIES, LTD. and having a crystalline melting point of 302° C.) were dry-blended in a weight ratio of 80/20 and kneaded at 350° C. with a two-screw extruder (LABOPLASTOMILL available from TOYO SEIKI KABUSHIKI KAISHA), followed by extruding to obtain a flexible fluorine-containing material of the present invention in the form of pellets.

The obtained pellets were put in a 100 mm diameter metal die which was then set on a press machine set at 350° C., followed by preheating for 30 minutes and then compression-molding at 70 kg/cm² for one minute to obtain an about 0.5 mm thick film.

The following physical properties of the obtained film were measured. The results are shown in Table 4.
(Mechanical Properties)

Tensile strength: The film is cut to a form of dumbbell described in ASTM-1467, and measurements are carried out at a cross head speed of 200 mm/min by using a TENSILON universal tester available from Orientec Corporation.

Elastic modulus: The film is cut to a form of dumbbell described in ASTM-1467, and measurements are carried out at a cross head speed of 200 mm/min by using a TENSILON universal tester available from Orientec Corporation.

Rubber hardness: Hardness A is measured according to JIS K 6301.

Resin hardness: Hardness D is measured according to JIS K 7215.
(Viscoelasticity)

The film is cut to a form Of strip of about 35×5 mm and set on a viscoelasticity meter RSA-2 available from Rheometric Co., Ltd. Then a viscoelasticity is measured at a frequency of 1 Hz at 150° C. and 200° C.
(Mold-processability)

A melt flow rate is measured under conditions of preheating at 372° C. for five minutes at a load of 5 kgf/cm² by using Koka-type flow tester (CFR-500C available from Shimadzu Corporation) and nozzles of 2 mm diameter×8 mm length.
(Surface Characteristics)

Water contact angle: A water contact angle on the film surface is measured at room temperature by using a contact angle meter.

Contact angle of 31 dyne solution: A solution (31 dyne solution) having a surface tension of 31 dyne/cm is prepared by mixing 97.5 (v/v %) of ethylene glycol and 2.5 (v/v %) of formaldehyde. A contact angle of 31 dyne solution is measured by using a contact angle meter.
(Non-tackiness)

Tackiness: The same two films are overlapped with each other and pressed at a load of 10 kgf for one minute. Then the films are separated. Tackiness is evaluated by a feeling of stickiness at separating. Criteria for judgement are represented by ⊚ when the films are separated spontaneously when the load is released; ○ when the films can be separated and peeled off by hands; and× when the films cannot be separated or are broken when peeled off.

Stain-proofing property: Five lines of 3 cm long are drawn on the film with a commercially available oily ink (black), and after air-drying for 60 seconds, the surface of the film is rubbed by ten turns with a 500 g metallic disc (50 mm diameter) with a commercially available gauze stuck on a flat bottom surface thereof. The evaluation is indicated by× when the lines remain un-erased after the rubbing by ten turns and ○ when no lines remain.

EXAMPLES 2 to 3

A flexible fluorine-containing material of the present invention was produced in the same manner as in Example 1 except that the mixing ratio of the fluorine-containing multi-segment polymer (a) to PFA (b) was changed as shown in Table 4, and each physical property was evaluated in the same manner as in Example 1. The results are shown in Table 4.

EXAMPLE 4

A flexible fluorine-containing material of the present invention was produced in the same manner as in Example 1 except that the polymer prepared in Preparation Example 2 was used as the fluorine-containing multi-segment polymer (a), and each physical property was evaluated in the same manner as in Example 1. The results are shown in Table 4.

EXAMPLE 5

A flexible fluorine-containing material of the present invention was produced in the same manner as in Example 2 except that FEP (NEOFLON FEP NP20 available from DAIKIN INDUSTRIES, LTD.) was used as the fluorine-containing resin (b) instead of PFA, and a film was produced. Each physical property was evaluated in the same manner as in Example 1. The results are shown in Table 4.

TABLE 4

| | Ex. 1 | Ex. 2 | Ex. 3 | Ex. 4 | Ex. 5 |
|---|---|---|---|---|---|
| Fluorine-containing material | | | | | |
| Fluorine-containing multi-segment polymer (a) | | | | | |
| Elastomeric segment A | TFE/ PMVE | TFE/ PMVE | TFE/ PMVE | TFE/ PMVE | TFE/ PMVE |
| (% by mole) | (61/39) | (61/39) | (61/39) | (64/36) | (61/39) |
| Non-elastomeric segment B | TFE/ PPVE | TFE/ PPVE | TFE/ PPVE | TFE/ PPVE | TFE/ PPVE |
| (% by mole) | (98/2) | (98/2) | (98/2) | (98/2) | (98/2) |
| Proportion of B in (a) (% by weight) | 17 | 17 | 17 | 33 | 17 |
| Fluorine-containing resin (b) | PFA | PFA | PFA | PFA | FEP |
| (a)/(b) (weight ratio) | 80/20 | 60/40 | 20/80 | 80/20 | 60/40 |
| Properties of material | | | | | |
| Mechanical properties | | | | | |
| Tensile strength (kg/cm$^2$) | 101 | 118 | 173 | 112 | 105 |
| Elastic modulus (kg/cm$^2$) | 152 | 189 | 212 | 168 | 145 |
| Rubber hardness (ASTR-A) | 54 | 64 | 85 | 58 | 59 |
| Resin hardness | 22 | 25 | 44 | 23 | 23 |
| Viscoelasticity | | | | | |
| 150° C.-E' (107 dyn/cm$^2$) | 6.50 | 6.70 | 6.80 | 6.55 | 6.2 |
| 200° C.-E' (107 dyn/cm$^2$) | 4.10 | 5.80 | 5.60 | 4.30 | 3.9 |
| Mold-processability (MFI: 372° C., 5 kgf) | 5.5 | 7.9 | 11.9 | 4.1 | 6.8 |
| Surface characteristics | | | | | |
| Water contact angle (degree) | 110 | 114 | 112 | 112 | 113 |
| Contact angle of 31 dyne solution (degree) | 58 | 61 | 57 | 59 | 60 |
| Non-tackiness | | | | | |
| Tackiness | ○ | ○ | ○ | ○ | ○ |
| Stain-proofing property | ○ | ○ | ○ | ○ | ○ |

COMPARATIVE EXAMPLE 1

A fluorine-containing material for comparison was produced in the same manner as in Example 1 except that PFA was not mixed, and each physical property was evaluated in the same manner as in Example 1. The results are shown in Table 5.

COMPARATIVE EXAMPLE 2

A fluorine-containing material for comparison was produced in the same manner as in Example 4 except that PFA was not mixed, and each physical property was evaluated in the same manner as in Example 1. The results are shown in Table 5.

COMPARATIVE EXAMPLE 3

A film was produced in the same manner as in Example 1 except that PFA (same one as in Example 1) was used alone without using a fluorine-containing multi-segment polymer, and each physical property was evaluated in the same manner as in Example 1. The results are shown in Table 5.

COMPARATIVE EXAMPLE 4

A fluorine-containing material for comparison was produced in the same manner as in Example 1 except that 67 parts by weight of a polymer prepared by fluorinating, in the same manner as in Preparation Example 1, the elastomeric polymer (a polymer before copolymerizing a non-elastomeric segment, TFE/PMVE=61/39 (mole ratio)) prepared in Preparation Example 1 and 33 parts by weight of PFA were used, and each physical property was evaluated in the same manner as in Example 1. The results are shown in Table 5.

TABLE 5

| | Com. Ex. 1 | Com. Ex. 2 | Com. Ex. 3 | Com. Ex. 4 |
|---|---|---|---|---|
| Fluorine-containing material | | | | |
| Fluorine-containing multi-segment polymer (a) | | | | |
| Elastomeric segment A | TFE/ PMVE | TFE/ PMVE | — | TFE/ PMVE |
| (% by mole) | (61/39) | (64/36) | — | (61/39) |
| Non-elastomeric segment B | TFE/ PPVE | TFE/ PPVE | — | — |
| (% by mole) | (98/2) | (98/2) | — | — |
| Proportion of B in (a) (% by weight) | 17 | 33 | — | 0 |
| Fluorine-containing resin (b) | — | — | PFA | PFA |
| (a)/(b)(weight ratio) | 100/0 | 100/0 | 0/100 | 67/23 |
| Properties of material | | | | |
| Mechanical properties | | | | |
| Tensile strength (kg/cm$^2$) | 77 | 95 | 277 | 35 |
| Elastic modulus (kg/cm$^2$) | 49 | 143 | 420 | 240 |
| Rubber hardness (ASTR-A) | 48 | 56 | >95 | 74 |
| Resin hardness | 20 | 23 | 60 | 40 |
| Viscoelasticity | | | | |
| 150° C.-E' (107 dyn/cm$^2$) | 3.10 | 6.50 | 88.0 | 2.80 |
| 200° C.-E' (107 dyn/cm$^2$) | 1.20 | 4.60 | 48.0 | 0.35 |
| Mold-processability (MFI: 372° C., 5 kgf) | 4.9 | 3.5 | 18.6 | 15 |
| Surface characteristics | | | | |
| Water contact angle (degree) | 106 | 108 | 110 | 98 |
| Contact angle of 31 dyne solution (degree) | 53 | 55 | 55 | 51 |
| Non-tackiness | | | | |
| Tackiness | x | x | ⊙ | x |
| Stain-proofing property | x | x | ○ | x |

INDUSTRIAL APPLICABILITY

As it is clear from the results of Table 4 and 5, in case where the fluorine-containing resin (PFA) is not mixed (Comparative Examples 1 and 2), non-tackiness (particularly stain removability) is inferior, and in case of a sole use of the fluorine-containing resin (PFA) (Comparative Example 3), the material does not have a flexibility at all. Also in case of the mixture comprising PFA and the fluorine-containing polymer which is not copolymerized with the non-elastomeric segment (Comparative Example 4), not only a mechanical strength is inferior but also mechanical properties are suddenly lowered at high temperature and non-tackiness is inferior. On the other hand, the flexible fluorine-containing material of the present invention can provide various products, particularly products and parts for OA equipment which are excellent in flexibility, mechanical strength, viscoelasticity (heat resistance) and mold-processability and have improved non-tackiness (particularly stain removability).

What is claimed is:

1. A flexible fluorine-containing material which comprises (a) a fluorine-containing multi-segment polymer having an elastomeric fluorine-containing polymer chain, segment A and a non-elastomeric fluorine-containing polymer chain segment B in which the elastomeric fluorine-containing polymer chain segment A comprises not less than 90% by mole of a perhaloolefin unit and (b) a fluorine-containing resin having a crystalline melting point or glass transition temperature of not less than 150° C., in which a weight ratio (a)/(b) is 1/99 to 99/1.

2. The flexible fluorine-containing material of claim 1, wherein said fluorine-containing resin (b) has a crystalline melting point or glass transition temperature of not less than 250° C.

3. The flexible fluorine-containing materials of claim 1, wherein said weight ratio (a) (b) is 20 80 to 99 1.

4. The flexible fluorine-containing material of claim 1, wherein the elastomeric fluorine-containing polymer chain segment A contained in the fluorine-containing multi-segment polymer (a) is non-crystalline and has a glass transition temperature of not more than 25° C.

5. The flexible fluorine-containing material of claim 4, wherein the non-elastomeric fluorine-containing polymer chain segment B contained in the fluorine-containing multi-segment polymer (a) is a polymer chain having a crystalline melting point or glass transition temperature of not less than 150° C.

6. The flexible fluorine-containing material of claim 1, wherein the non-elastomeric fluorine-containing polymer chain segment B contained in the fluorine-containing multi-segment polymer (a) is a polymer chain having a crystalline melting point or glass transition temperature of not less than 150° C.

7. The flexible fluorine-containing material of claim 6, wherein the non-elastomeric fluorine-containing polymer chain segment B contained in the fluorine-containing multi-segment polymer (a) is a polymer chain having a crystalline melting point or glass transition temperature of not less than 250° C.

8. The flexible fluorine-containing material of claim 1, wherein the elastomeric fluorine-containing polymer chain segment A contained in the fluorine-containing multi-segment polymer (a) is a polymer chain having 50 to 85% by mole of tetrafluoroethylene and 15 to 50% by mole of perfluoro(alkyl vinylether) and or hexafluoropropylene.

9. The flexible fluorine-containing material of claim 8, wherein the non-elastomeric fluorine-containing polymer chain segment B contained in the fluorine-containing multi-segment polymer (a) is a polymer chain comprising more than 85% by mole and not more than 100% by mole of tetrafluoroethylene and 0% by mole or less than 15% by mole of a compound of the formula (1):

$$CH_2=CF-R_f^1 \qquad (b\ 1)$$

wherein $R_f^1$ $CF_3$ or $OR_f^1$ in which $R_f^2$ is a perfluoroalkyl group having 1 to 5 carbon atoms.

10. The flexible fluorine-containing material of claim 9, wherein the fluorine-containing resin (b) is one or more member selected from perfluoro fluorine-containing resins.

11. The flexible fluorine-containing material of claim 1, wherein the non-elastomeric fluorine-containing polymer chain segment B contained in the fluorine-containing multi-segment polymer (a) is a polymer chain comprising more than 85% by mole and not more than 100% by mole of tetrafluoroethylene and 0% by mole or less than 15% by mole of a compound of the formula (1):

$$CF_2=CF-R_f^1 \qquad (1)$$

wherein $R_f^1$ is $CF_3$ $OR_f^2$ is a perfluoroalkyl group having 1 to 5 carbon atoms.

12. The flexible fluorine-containing material of the claim 1, wherein the fluorine-containing resin (b) is one or more members selected from perfluoro fluorine-containing resins.

13. The flexible fluorine-containing material of claim 12, wherein the fluorine-containing resin (b) is one or more members selected from polytetrafluoroethylene, tetrafluoroethylene/perfluoro(alkyl vinyl ether) copolymer, tetrafluoroethylene/hexafluoropropylene copolymer and tetrafluoroethylene/hexafluoropropylene/perfluoro(alkyl vinyl ether) copolymer.

14. The flexible-containing material of claim 1, wherein a proportion of the non-elastomeric fluorine-containing polymer chain segment B contained in the fluorine-containing multi-segment polymer (a) is not more than 25% by weight based on the whole segment polymer (a).

* * * * *